United States Patent
Huysegems et al.

(10) Patent No.: US 9,444,739 B2
(45) Date of Patent: Sep. 13, 2016

(54) CONGESTION CONTROL IN CACHING ENABLED VIDEO NETWORKS

(75) Inventors: Rafael Huysegems, Walem (BE); Koen De Schepper, Edegem (BE)

(73) Assignee: Alcatel Lucent, Boulogne-Billancourt (FR)

( * ) Notice: Subject to any disclaimer, the term of this patent is extended or adjusted under 35 U.S.C. 154(b) by 4 days.

(21) Appl. No.: 13/498,792

(22) PCT Filed: Sep. 17, 2010

(86) PCT No.: PCT/EP2010/063730
§ 371 (c)(1),
(2), (4) Date: Mar. 28, 2012

(87) PCT Pub. No.: WO2011/036106
PCT Pub. Date: Mar. 31, 2011

(65) Prior Publication Data
US 2012/0185594 A1 Jul. 19, 2012

(30) Foreign Application Priority Data

Sep. 28, 2009 (EP) .................................... 09290735

(51) Int. Cl.
*G06F 15/173* (2006.01)
*H04L 12/801* (2013.01)
*H04L 29/08* (2006.01)

(52) U.S. Cl.
CPC ............... *H04L 47/10* (2013.01); *H04L 47/11* (2013.01); *H04L 47/12* (2013.01); *H04L 47/19* (2013.01); *H04L 67/20* (2013.01); *H04L 67/306* (2013.01)

(58) Field of Classification Search
CPC ..... H04L 67/20; H04L 67/306; H04L 47/10; H04L 47/11; H04L 47/12; H04L 47/19; G06F 15/173

USPC ......................................... 709/224, 225, 226
See application file for complete search history.

(56) References Cited

U.S. PATENT DOCUMENTS 7,433,941 B1 * 10/2008 Lavian et al. ................ 709/223
2003/0221000 A1 * 11/2003 Cherkasova et al. ......... 709/224
(Continued)

FOREIGN PATENT DOCUMENTS

| CN | 101116293 A | 1/2008 |
| CN | 101184209 A | 5/2008 |

(Continued)

OTHER PUBLICATIONS

International Search Report for PCT/EP2010/063730 dated Dec. 13, 2010.

*Primary Examiner* — Vivek Srivastava
*Assistant Examiner* — Normin Abedin
(74) *Attorney, Agent, or Firm* — Fay Sharpe LLP

(57) ABSTRACT

The present invention relates to a method, related system, related congestion monitoring device and related media delivery personalization devices for controlling congestion in a media delivery network that includes a media delivery server and a plurality of client devices. The media delivery server is coupled over the media delivery network to each client device of the plurality of client devices. The media delivery server delivering media to a client device over a path between the media delivery server and the client device. The related method includes the steps of monitoring congestion in the media delivery network and subsequently adapting a level of personalization of the delivering of media to the client device based on the congestion monitored.

11 Claims, 2 Drawing Sheets

(56) References Cited

U.S. PATENT DOCUMENTS

| | | | |
|---|---|---|---|
| 2004/0114576 A1* | 6/2004 | Itoh | H04L 1/0009 370/352 |
| 2006/0176810 A1 | 8/2006 | Kekki | |
| 2008/0002573 A1* | 1/2008 | Mosko | H04L 47/2458 370/229 |
| 2008/0279100 A1* | 11/2008 | Yuan et al. | 370/231 |

FOREIGN PATENT DOCUMENTS

| | | |
|---|---|---|
| WO | WO 97/07656 A2 | 3/1997 |
| WO | WO 01/50689 A1 | 7/2001 |

\* cited by examiner

CONGESTION CONTROL IN CACHING ENABLED VIDEO NETWORKS

The present invention relates to a Method for controlling congestion in a media delivery network as described in the preamble of claim 1 and a related system as described in claim 2.

Currently, network congestion control in media delivery networks typically is performed by means of admission control which results in denying the setup of new video-deliveries in the congested network. In this way, the network will avoid quality deterioration on the already established flows.

Media services such as Video on Demand, further referred to as VoD, pause TV but also long tail content e.g. provided on Internet video stores such as YouTube are generating an increasing amount of unicast-traffic in the network. To solve the scalability issues that come with unicast deliveries, operators are moving to caching and buffering techniques to support media transport and delivery. Furthermore, novel services that use some form of personalization such as targeted advertising will even more accelerate this evolution.

Admission control mechanisms in media delivery networks wherein caching and buffering is applied, simple admission control turns out to be inefficient. In case of congestion in the network-part where the media servers are located or in the central part of the network, there is no reason to deny a new delivery if that delivery could have been served from a local cache, close to the user. The denial of such a request is not only leading to unnecessary frustration of the user and a revenue miss for the operator but is at the same time completely useless as an attempt to control the congestion. It is clear that the conventional methods to control congestion are not always efficient in caching and buffering based media delivery networks.

Another technique applied in traditional networks is to reduce the quality level of the video (and thus the required BW on the links) to relief the network congestion. This method is also ineffective in caching networks since the lower-quality video is differently encoded and causes additional stress on the storage and on the required BW in the network.

An objective of the present invention is to provide a congestion control method of the above known type but wherein the congestion control is more effective.

According to the invention, this object is achieved by the method for controlling congestion in a media delivery network according to claim 1, the system for controlling congestion in a media delivery network according to claim 2, the Media Delivery Personalization device according to claim 3 and the Congestion monitoring device CMD according to claim 7.

Indeed, this objective is achieved due to the fact that the method for controlling congestion in a media delivery network first comprises the step of monitoring of congestion in the media delivery network and subsequently the step of adapting a level of personalization of delivering media to the client device based on the monitored congestion in the media delivery network.

This level of personalization is the extent to which the media asset delivery may include media assets with high popularity only, meaning that only media assets which are requested by many client devices at the same time may be delivered or that in addition also media assets only requested by relatively few client devices, i.e. media assets with a lower popularity, may be included in the media asset delivery.

A high level of personalization of a media delivery to a client device implies that, not only the media assets with high popularity can be delivered but in addition also media assets having a low popularity. Contrary, a lower level of personalization means that for the delivery of media to the client device, only media assets having a higher popularity i.e. being standard media assets and more popular media at that moment will be offered. As a result, intermediate autonomously optimizing caches will be able to reuse more media in case only media assets with high popularity are delivered which require less bandwidth and storage capacity within the media delivery network. Hence by applying a low level of personalization in delivering media assets to a client device, congestion can be reduced. In case of congestion in the network, this congestion can be reduced by restricting the level of personalization of media delivery, meaning that only media assets can be delivered that are frequently requested by coupled client devices so that only a restricted number of distinct media assets are to be delivered to the coupled client devices. Hence by restricting the number of distinct media assets to be delivered only this limited amount of media assets needs to cached/buffered in the media delivery network directly decreasing network load.

In case of applying a high level of personalization in delivering media assets to a client device, the load on network links and caches increases as not only a restricted number of popular media assets can be delivered but in addition also a large amount of distinct media assets which have a lower popularity which directly imposes a higher load on network links and elements like caching—and/or buffering elements.

By providing a large amount of different media assets a low degree of multicast-traffic and a high degree of unicast-traffic results which is imposed on the media delivery network directly increasing the network load on the media delivery network.

The media delivery network may include a caching and/or buffering network, a streaming network or any combination thereof.

In accordance with the method and system according to the present invention the adaptation of the level of personalization to control the congestion in the network may be increasing or decreasing this level of personalization where in case of no or low congestion in the network and caches the level of personalization is changed to a high level of personalization. However in case the congestion of the network and caches/buffers is high, the level of personalization is decreased.

Congestion in the network can be determined by a dedicated and centralized entity for network monitoring or by monitoring entities that are embedded in the network elements.

Congestion in the media delivery network preferably may be determined on any link or network element on the path between the media source and the client device.

A media asset is defined as an entire media item such as a movie, documentary or show, or as a temporal or spatial subset of the entire media asset. Personalization can be based on entire media items (e.g. when the number of titles in a VoD catalog is depending on the user profile) or on segments (e.g. when a personalized news is assembled based on individual new-items called segments that are investigated for their relevance against the user-profile).

Another characteristic feature of the present invention is described in claim 4.

The Media Delivery Personalization device further comprises a personalization level effecting part that is adapted to effect media delivery to each client device of the plurality of client devices in accordance with the level of personalization as determined by the personalization determination module.

This personalization level effecting part determines, in accordance with the level of personalization as determined by the personalization determination module, for each client device the available media assets from a full list of media assets using the level of personalization for selecting the media assets for delivery to the client device. Alternatively or in addition to, the personalization level effecting part determines still in accordance with the level of personalization as determined by the personalization determination module whether or not a media asset may include personalized or non-personalised media asset segments like ads or news-items of a news show, or any other form of temporal or spatial segments.

The selection available media assets or inclusion of personalized or non-personalised media asset segments is made either with or without the application of a user-profile of the user of the corresponding client device.

Alternatively or additionally the personalization level effecting part determines whether or not the option of time shifting is available in accordance with the level of personalization as determined by the personalization determination module A further characteristic feature of the present invention is described in claim 5.

The personalization level effecting part is adapted to effect the media delivery to each client device of the plurality of client devices by presenting a client device in case of a low network congestion level, a set of media assets including media assets with low popularity and high popularity for delivery and in case of a high network congestion level presenting a client device with a set of media assets including media assets high popularity only for delivery.

This personalization level effecting part determines, in accordance with the level of personalization as determined by the personalization determination module, for each client device the available media assets from a full list of media assets, using the level of personalization for selecting the media assets for delivery to the client device. Alternatively or in addition to, the personalization level effecting part determines still in accordance with the level of personalization as determined by the personalization determination module whether or not a media asset may include personalized or non-personalised media asset segments like ads or news-items of a news show, or any other form of temporal or spatial segments.

The selection available media assets or inclusion of personalized or non-personalised media asset segments is made either with or without the application of a user-profile of the user of the corresponding client device.

Alternatively or additionally the personalization level effecting part determines whether or not the option of time shifting is available in accordance with the level of personalization as determined by the personalization determination module.

Another further characteristic feature of the present invention is described in claim 6.

The personalization level effecting part is able to effect the media delivery to each client device of the plurality of client devices by presenting, in case of a low network congestion level, this client device with the option of time-shift delivery of each available media assets and in case of a high network congestion level with no option of time-shift delivery of each of the available media assets.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein.

Figure 1:
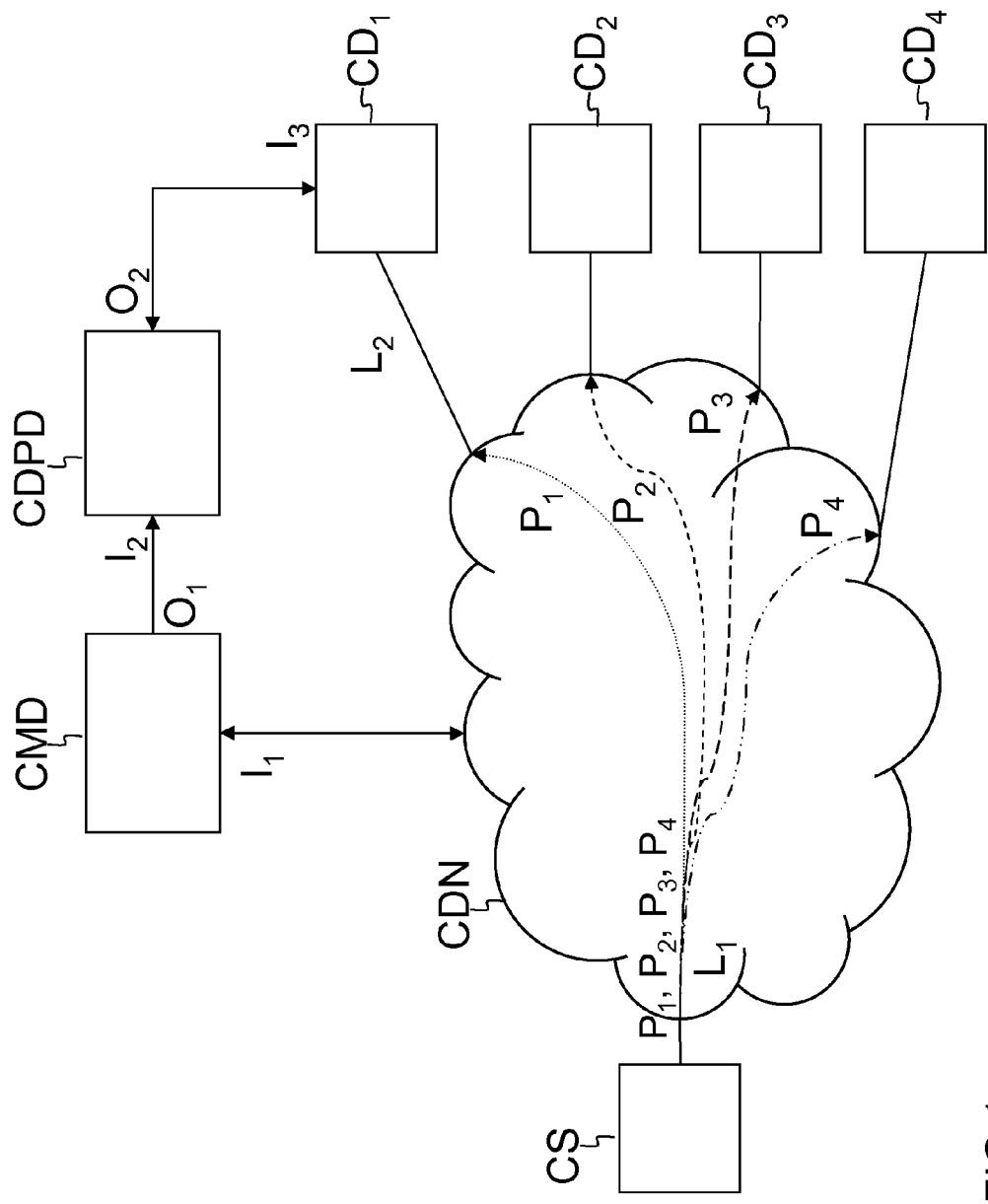
FIG. 1 represents a functional representation of the media delivery network wherein the implementation of the present invention is realized.
Figure 2:
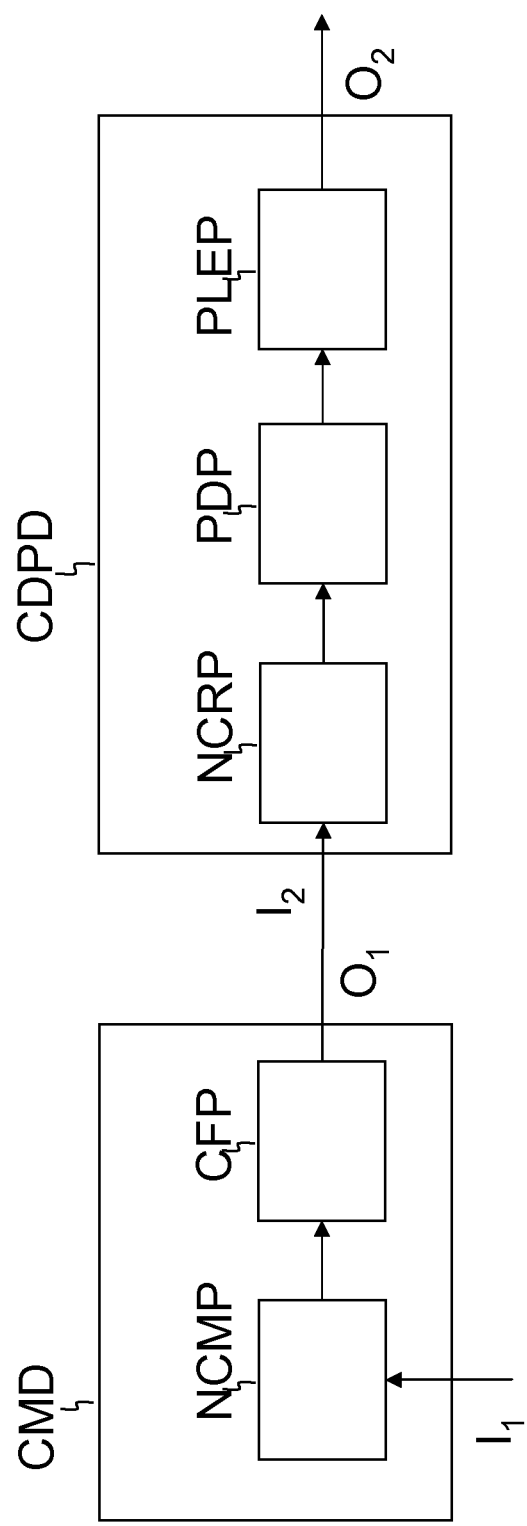
FIG. 2 represents the functional representation of the congestion monitoring device MD and the functional representation of the media delivery personalization device CDPD.

In the following paragraphs, referring to the drawings, an implementation of the method and the related devices according to the present invention will be described. In the first paragraph of this description the main elements of this network as presented in FIG. 1 and FIG. 2 are described. In the second paragraph, all connections between the before mentioned network elements and described means are defined. In the succeeding paragraph the actual execution of the method for controlling congestion in a media delivery network.

An essential element of this embodiment of the present invention is a media server CS which may be a media source store, a video headend, a VoD server or a segment based media server and a plurality of client devices which may be a set top box at user's premises with coupled television screen, Personal Computer or mobile devices. The communications network coupling each of the client devices CD1, CD2, CD3, and CD4 with the media server CS may include a caching and/or buffering network being built up of a plurality of caching and/or buffering elements, a streaming network or any combination thereof.

Moreover the system includes a congestion monitoring device CMD which is, adapted to monitor congestion in the media delivery network. This congestion monitoring device CMD may be a stand-alone dedicated device or may be combined with actual network elements. The system further includes a media delivery personalization device CDPM that is able to adapt a level of personalization of the delivering media to a client device CD based on said congestion monitored.

Each of the client devices CD1, CD2, CD3, CD4, is coupled to the media server CS over the media delivery network. The congestion monitoring device CMD is coupled to one or more network elements in the media delivery network CDN and in addition coupled over a dedicated link or network or via a CDN link to the media delivery personalization device CDPM. The media delivery personalization device CDPM further is connected to each client device of the plurality of client devices CD1, CD2, CD3, and CD4 over the CDN or over an alternative network.

The Congestion monitoring device CMD includes a network congestion monitoring part NCMP that is adapted to monitor congestion within the media distribution network and determine a level of network congestion. This congestion in the media delivery network may be deduced from the BW filling level of the links, the average packet delay, the end-to-end delay that was encountered in the delivery, the number of retransmits, or any combination of congestion indicators.

Congestion monitoring device CMD further includes a congestion level forwarding part CFP adapted to send a message to a Media Delivery Personalization device CDPD indicating the network congestion level for determining the congestion control actions by the Delivery Personalization device CDPD.

The Congestion monitoring device CMD has an input-terminal $I_1$ that is at the same time an input terminal of the network congestion monitoring part NCMP. The network congestion monitoring part NCMP further is coupled to the congestion level forwarding part CFP that in turn ahs an output-terminal which is at the same time an output terminal $O_1$ of the Congestion monitoring device CMD.

The Media Delivery Personalization device CDPD includes a network congestion receiving part NCRP that is adapted to receive a network congestion message from a congestion monitoring device where this message provides a level of network congestion of the media delivery network CDN. This level of congestion may be expressed as a single number representing the global congestion in the network or can be split up in discrete congestion values for the different paths or network elements or links in the network.

Media Delivery Personalization device CDPD further includes a personalization determination module PDM that is adapted to determine a level of personalization of the media delivery to the client device based on the level of network congestion and in addition the Media Delivery Personalization device CDPD comprises a personalization level effecting part PLEP that is able to adapted to effect the media delivery to each client device of the plurality of client devices CD1, CD2, CD3, CD4 in accordance with the level of personalization determined.

The Media Delivery Personalization device CDPD has an input-terminal $I_2$ that is at the same time an input terminal of the a. a network congestion receiving part NCRP. The network congestion receiving part NCRP further is coupled to the personalization determination part PDP that in turn is coupled to the personalization level effecting part PLEP that has an output-terminal which is at the same time an output terminal $O_2$ of the Congestion monitoring device CMD.

In order to explain the execution of the present invention it is supposed that a first user at client device CD 1 is watching media at his television. This media may be any video asset like popular broadcasts like soccer or other sports broadcast, news, any movie, video on demand asset, long tail assets like YouTube assets or other internet based media asset. Alternatively this media may additionally contain personalized fully profiled and customized topics like e.g. news, adds etcetera.

Now the first user at CD1 is watching a personalized media asset P1 like a YouTube movie posted by a family member. A second user at CD2 is watching another personalized media asset P2 at his client device CD2 like the further users at terminals CD3 and CD4 are watching respectively personal P3, P4.

In this situation all personalized assets $P_1$, $P_2$, $P_3$ and $P_4$ are forwarded through the media delivery network toward the respective client devices CD1, CD2, CD3, and CD4. (see FIG. 1)

At a certain moment time congestion at a common link in the media delivery network transporting all personalized assets $P_1$, $P_2$, $P_3$ and $P_4$, congestion occurs and is subsequently detected by the network congestion monitoring part NCMP of the Congestion monitoring device CMD. The network congestion monitoring part NCMP monitors the load of network links, caching and buffering network elements and detects congestion on link L1 of the media delivery network CDN.

Alternatively congestion could have been detected based on information received from one or more nodes on the path from server to client, including the client itself on an adjacent link to the client device.

The congestion monitoring part NCMP formulates a level of congestion and forwards this level of congestion to the congestion level forwarding part CFP that in turn sends a message to a Media Delivery Personalization device CDPD indicating the network congestion level.

The network congestion receiving part NCRP, of the Media Delivery Personalization device CDPD, receives a network congestion message from a congestion monitoring device where this message provides with a level of network congestion of the media delivery network CDN. This level of congestion indicates congestion at link L within the media delivery network CDN.

The personalization determination module PDM determines a level of personalization of the media delivery for each of the client devices based on the received level of network congestion by deciding that the level of personalization of media delivery is to be decreased with a certain amount and hence no further media with low popularity, being media that is to be fetched far away in the network is allowed for the time being. Instead media assets with high popularity with are to be delivered to each of the client devices CD1, CD2, CD3, and CD4. the Intention here is to deliver as much as possible media assets that are watched by more than one of the users at the respective client devices CD1, CD2, CD3, CD4 in this way reducing load on network links and elements.

In case no action would be taken, one or more of the personal media assets $P_1$, $P_2$, $P_3$ and $P_4$ will due to lack of bandwidth be influenced by this lack of bandwidth and possibly quality of the media will deteriorate.

Hence based on the information the personalization level effecting part PLEP that is able to effect the media delivery to each client device of the plurality of client devices CD1, CD2, CD3, CD4 present the users at each of the client devices CD1, CD2, CD3, CD4, at request of the client device with media option the user has. The media options may be a non-personalized list of available media assets, exclusion of the option of time-shifted viewing media which is in accordance with the level of personalization determined.

Furthermore based on the level of personalization determined any of the media assets will include compositions of personalized or non-personalized media like included adds based on a specific user profile (user profile of user at client device CD1) or include a standard, non-personalized add in accordance with the determined level of personalization.

An alternative embodiment of the present invention may be the situation wherein both the Congestion monitoring device CMD as the Media Delivery Personalization device CDPD, are implemented in each client device, a network element adjacent to the link L2 in case of client device CD1; see FIG. 1) (e.g. implemented in network element at the edge of the media delivery network CDN), In this situation the congestion, e.g. asset delay on link L2, can be monitored at link L2 by the Congestion monitoring device CMD either in the client device or in the network element at the edge of the media delivery network. The subsequent operation of this embodiment is practically equal the previous described embodiment. This embodiment is only shown (In FIG. 1) for a client device CD1. The same implementation may be applied for any of the client devices CD2, CD3 and CD4.

The personalization level effecting part determines, in accordance with the level of personalization as determined by the personalization determination module, for each client device the available media assets from a full list of media assets using the level of personalization for selecting the media assets for delivery to the client device. Alternatively or in addition to, the personalization level effecting part determines still in accordance with the level of personalization as determined by the personalization determination module whether or not a media asset may include personalized or non-personalised media asset segments like ads or news.

The selection of available media assets or the inclusion of personalized or non-personalised media asset segments is made either with or without the application of a user-profile of the user of the corresponding client device.

Furthermore, it is to be noted that in the previous embodiment there may be a Media rendering device present at the edge of the media delivery network for rendering the media assets determined by the personalization level effecting part of the media delivery personalisation device to the client device CD1, CD, 2, CD3, CD4.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. A method for controlling congestion in a media delivery network, the media delivery network comprising a media delivery server and a plurality of client devices, the media delivery server being coupled over the media delivery network to each client device of the plurality of client devices, the media delivery server delivering media to a client device over a path between the media delivery server and the client device, wherein the method comprises:
monitoring congestion in the media delivery network;
adapting a level of personalization of the delivering media to the client device based on the congestion monitored, wherein, in the case of no congestion or low congestion in the network and caches, the level of personalization is raised and, in the case of high congestion in the network and caches, the level of personalization is decreased; and
presenting to each client device of the plurality of client devices, in case of a low network congestion level, a set of media assets including media assets with low and high popularity, and in case of a high network congestion level, with a set of media assets including media assets with high popularity only, for delivery.

2. A system for controlling congestion in a media delivery network, the media delivery network comprising a media delivery server and a plurality of client devices, the media delivery server being coupled to each client device of the plurality of client devices over the media delivery network, the media delivery server delivering media to a client device over a path between the media delivery server and the client device, wherein the system comprises:
a congestion monitoring device, adapted to monitor congestion in the content delivery network; and
a media delivery personalization device, adapted to adapt a level of personalization of the delivering media to the client device-based on the congestion monitored, wherein, in the case of no congestion or low congestion in the network and caches, the level of personalization is raised and, in the case of high congestion in the network and caches, the level of personalization is decreased,
wherein, the media delivery personalization devices is further adapted to present the client device, in case of a low network congestion level, a set of media assets including media assets with low and high popularity, and in case of a high network congestion level, with a set of media assets including media assets with high popularity only, for delivery.

3. The system of claim 2, wherein the Media Delivery Personalization device, further comprises one or more processors configured to:
receive a network congestion message from a congestion monitoring device, the message providing a level of network congestion of the media delivery network; and
determine a level of personalization of the media delivery to the client device based on the level of network congestion.

4. A system, according to claim 3, wherein the Media Delivery Personalization device, is further adapted to effect media delivery to each client device of the plurality of client devices in accordance with the level of personalization determined.

5. A system, according to claim 4, wherein the Media Delivery Personalization device is further adapted to effect media delivery to each client device of the plurality of client devices by presenting, in case of a low network congestion level, the client device, with the option of time-shift delivery of each available media asset, and in case of a high network congestion level, with no option of time-shift delivery of each available media asset.

6. The system of claim 2, wherein the congestion monitoring device, is further configured to:
formulate a level of congestion of the media delivery network; and
send a notification to a Media Delivery Personalization device indicating the network congestion level of the media forwarding network.

7. A Congestion Monitoring Device configured to monitor congestion in a media delivery network, wherein the Congestion Monitoring Device is configured to:
monitor congestion within the media delivery network and determine a level of network congestion; and
send a message to a Media Delivery Personalization Device indicating the network congestion level,
wherein the Media Delivery Personalization Device is adapted to configure a level of personalization of data being delivered to client devices based on the level of congestion monitored, and wherein the Media Delivery Personalization Device is configured to present to client devices, in case of a low network congestion level, a set of media assets including media assets with low and high popularity, and in case of a high network congestion level, with a set of media assets including media assets with high popularity only, for delivery.

8. The Congestion Monitoring Device of claim 7, wherein the Congestion Monitoring Device is coupled to one or more network elements in the media delivery network.

9. The Congestion Monitoring Device of claim 7, wherein the Congestion Monitoring Device and a Media Delivery Personalization Device are both implemented in a client device implemented in the media delivery network.

10. A Media Delivery Personalization Device configured to configure a level of personalization of data being delivered to client devices in a media delivery network based on network congestion, wherein the Media Delivery Personalization Device comprises one or more processors configured to:

receive a network congestion message from a Congestion Monitoring Device;

determine a level of personalization of the media delivered to client devices based on the level of network congestion; and effect the delivery of media to client devices, wherein, in the case of no congestion or low congestion in the network and caches, the level of personalization is raised and, in the case of high congestion in the network and caches, the level of personalization is decreased, wherein the delivery of media to client devices is such as to effect media delivery to each client device of the plurality of client devices by presenting the client device, in case of a low network congestion level, a set of media assets including media assets with low and high popularity, and in case of a high network congestion level, with a set of media assets including media assets with high popularity only, for delivery.

11. The Media Delivery Personalization Device of claim 10, wherein the Media Delivery Personalization Device and the Congestion Monitoring Device are both implemented in a client device implemented in the media delivery network, wherein the Congestion Monitoring Device is configured to monitor the congestion level in the media delivery network.

* * * * *